March 29, 1927.
M. J. O'LEARY
VALVE GEAR
Filed July 12, 1920
1,622,464
5 Sheets-Sheet 1
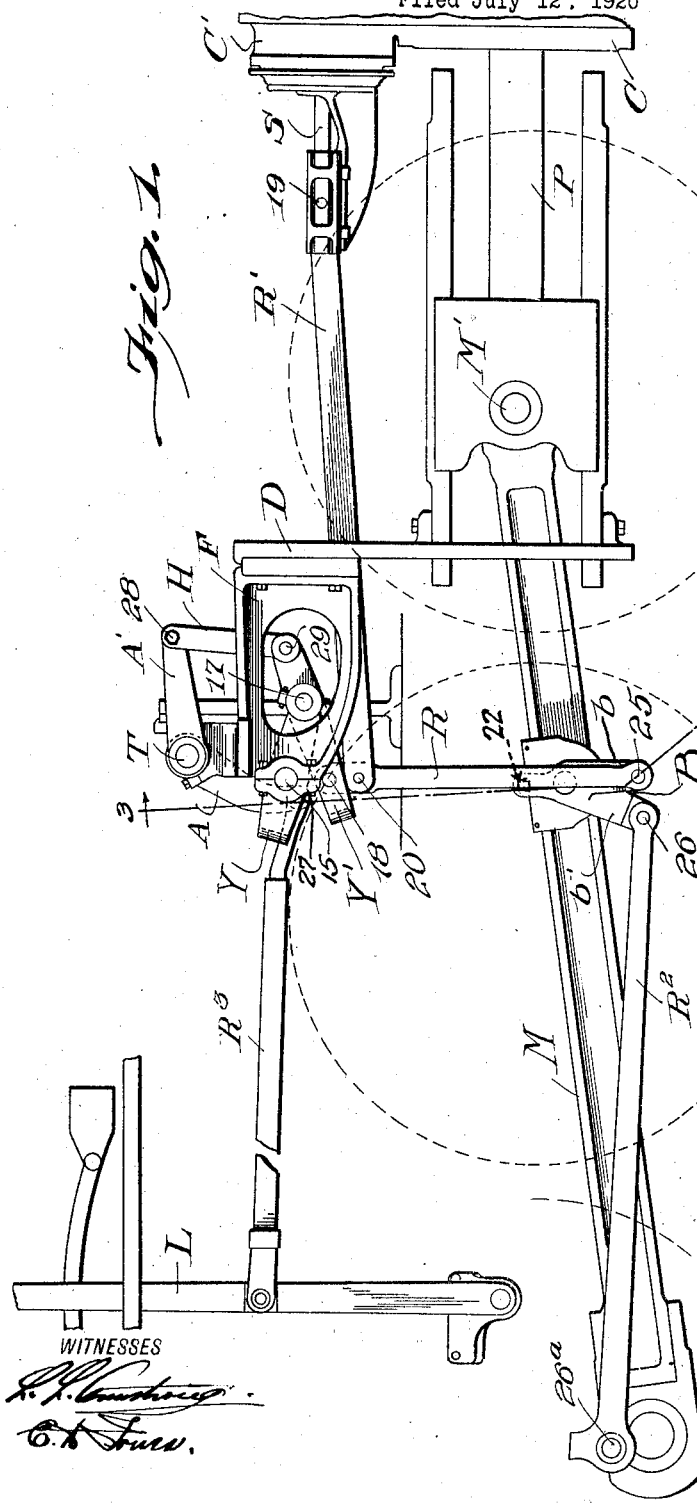

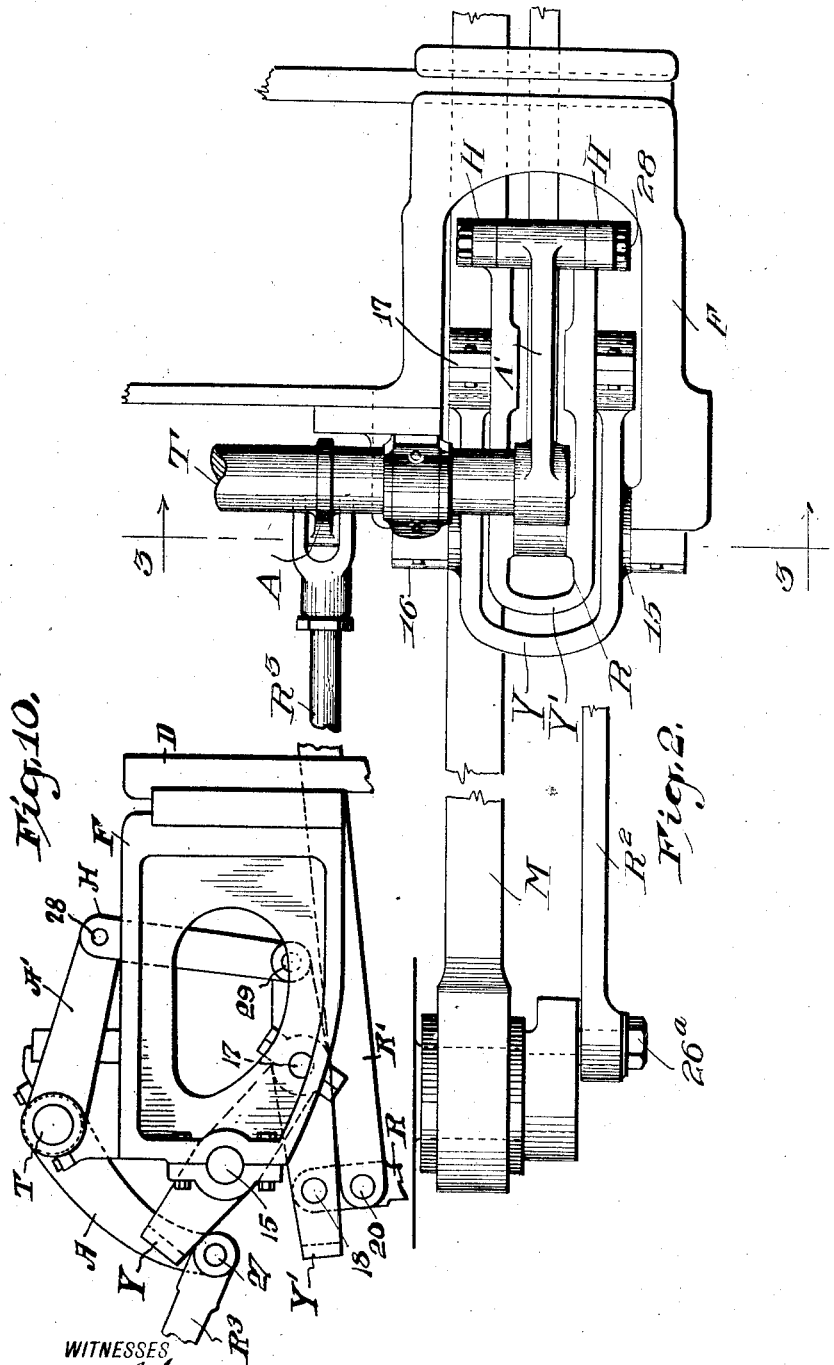

March 29, 1927.  M. J. O'LEARY  1,622,464
VALVE GEAR
Filed July 12, 1920  3 Sheets-Sheet 3
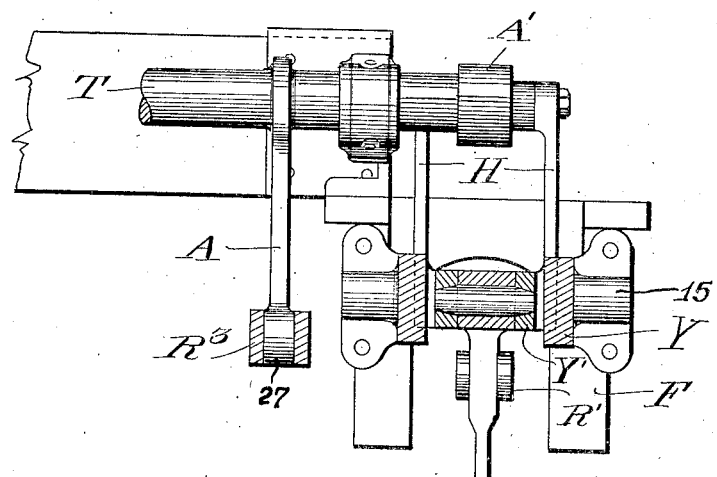
Fig. 5.
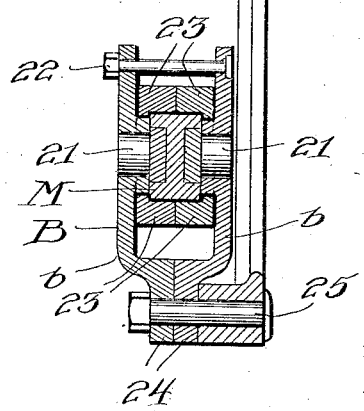
WITNESSES
INVENTOR
M. J. O'Leary
BY
ATTORNEYS

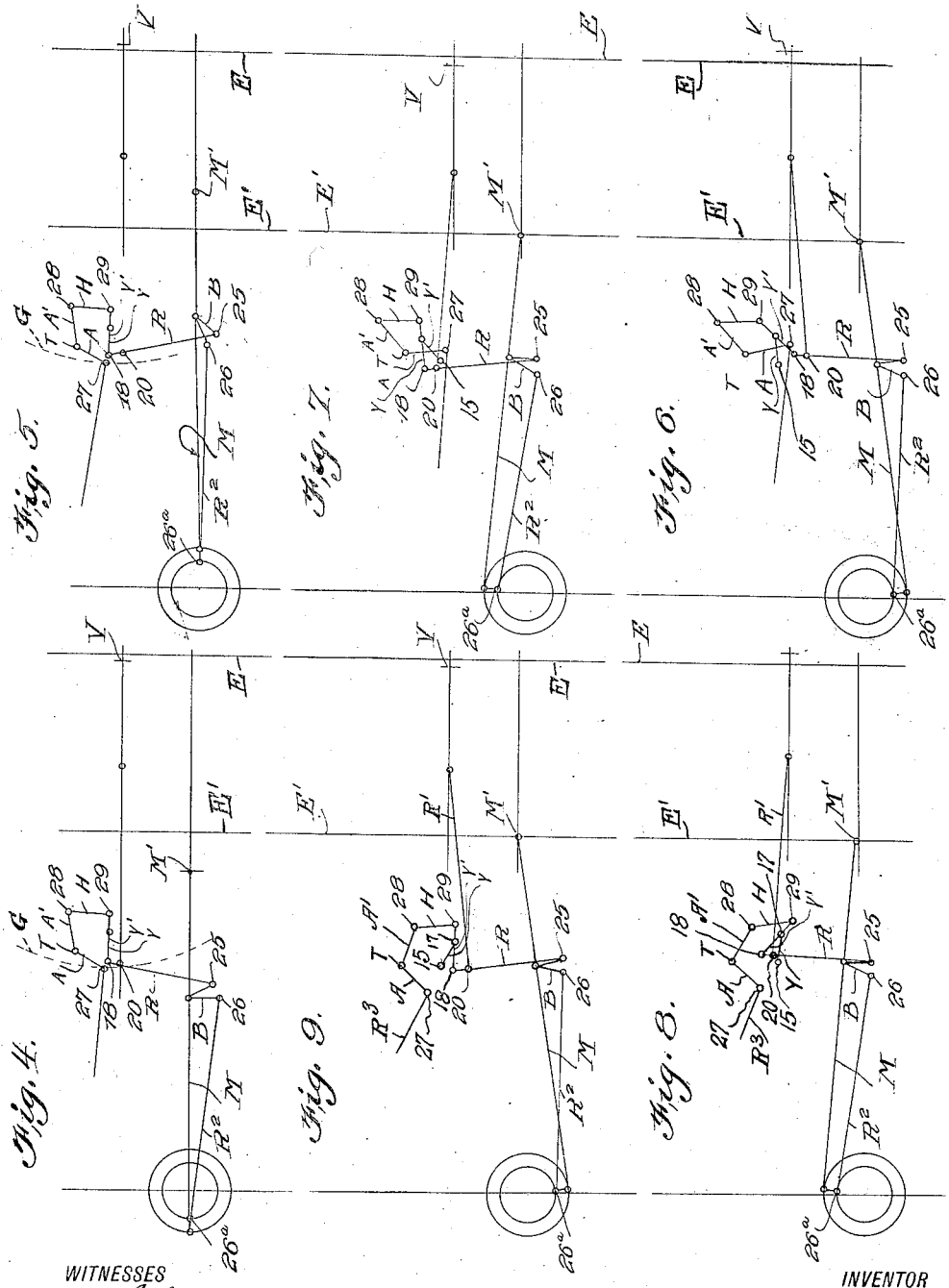

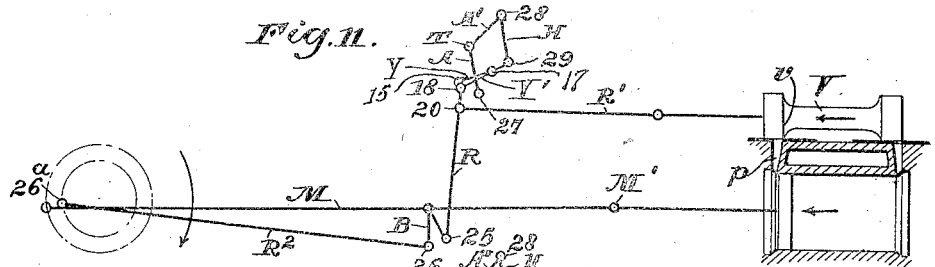
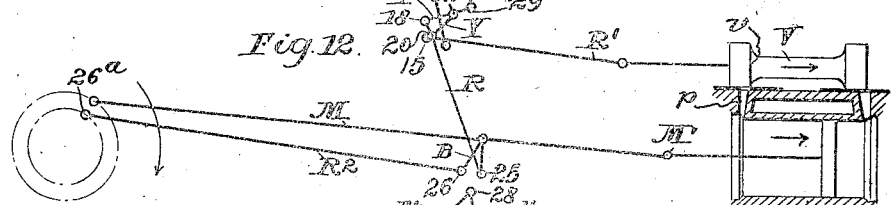
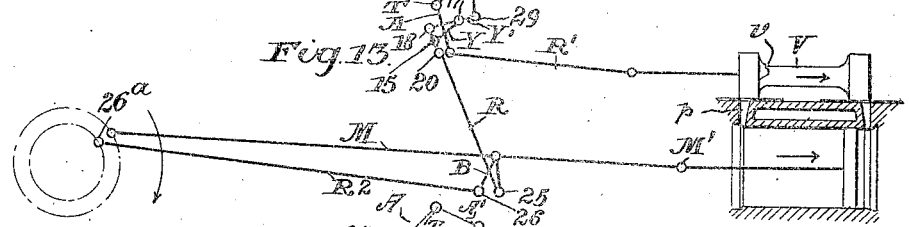
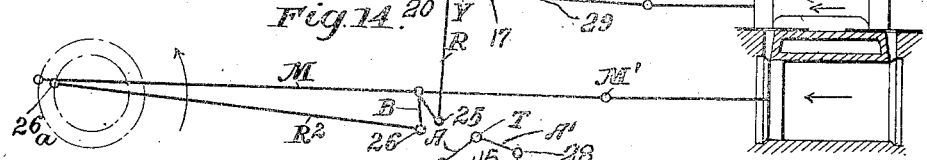
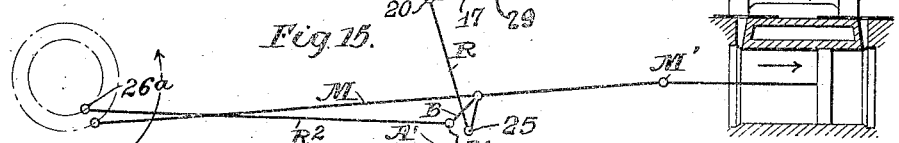
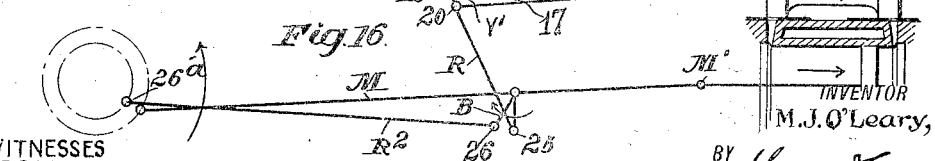

Patented Mar. 29, 1927.

1,622,464

UNITED STATES PATENT OFFICE.

MATHEW JOSEPH O'LEARY, OF CHICKASHA, OKLAHOMA.

VALVE GEAR.

Application filed July 12, 1920. Serial No. 395,685.

My invention relates generally to valve gears adapted for use in the actuating of valves to control the distribution of motive fluids to engines, and particularly, although not necessarily, to valve gears for locomotives.

A purpose of my invention is the provision of a valve gear having the following advantages; reduced preadmission and compression; large area of port opening in proportion to cut off; quick admission at beginning of piston stroke; quick release at the end of the piston stroke; reduced cost of application and maintenance; adaptability to locomotives of standard construction; and simplicity of construction rendering it less liable to errors due to shop irregularity.

I will describe one form of valve gear embodying my invention and will then point out the novel features thereof in claims.

In the accompanying drawings:

Figure 1 is a side elevation of enough of a locomotive to illustrate the application of one form of valve gear, this gear being in a central position so far as operation is concerned.

Figure 2 is a top plan view of a part of the valve gear shown in Figure 1.

Figure 3 is a vertical sectional view taken on the lines 3—3 of Figures 1 and 2.

Figures 4 to 9 inclusive are views showing diagrammatically the various positions of the valve gear, Fig. 10 is a detail side elevation showing the mechanism on the frame F in the reverse position, and Fig. 11 is a diagram showing the valve gear in position for forward motion the valve and crank being at admission, Fig. 12 is a diagram showing the gear in position for forward motion the valve and crank being at cut-off.

Fig. 13 is a diagram showing the gear in position for forward motion the valve and crank being at release position, Figs. 14 to 16 are diagrams showing the gear in position for backward motion, the valve and crank being at positions for admission, cut-off and release, respectively.

Similar reference characters refer to similar parts in each of the several views.

Referring specifically to the drawings and particularly to Figure 1, I have here shown only those parts of the locomotive which are necessary to a clear understanding of the construction and operation of the valve gear, and in which M designates the main rod and P the piston rod to which the main rod is operatively connected and which works within a cylinder C. Above the cylinder C is the valve chamber C' in which works reciprocating valves of standard construction provided with a common stem S.

The valve gear forming the subject matter of my invention comprises a gear frame designated at F and supported in proper position by means of a standard D. As illustrated to advantage in Figure 2, the gear frame F is of substantially U-shaped formation with a compensating yoke Y fulcrumed thereon by means of stub shafts 15 formed integral with the yoke and journaled in sectional bearings 16 carried by the free ends of the parallel portions of the gear frame. Arranged within the compensating yoke Y is a motion yoke Y' which is supported for swinging movement upon the compensating yoke at the point indicated at 17 in Figure 1, suitable pins and bearings being provided for this purpose. This pivotal point 17 will be hereinafter referred to as the compensating knuckle. As shown in Figure 2, the motion yoke Y' is supported upon the compensating yoke for swinging movement intermediate its end and at the forward end of the compensating yoke, while both of the yokes Y and Y' are of U-shaped formation, which construction renders them extremely strong and durable. At a point adjacent the rear end of the motion yoke Y', the upper end of a combination rod R is pivotally connected thereto at the point indicated at 18. The combination rod R is adapted to actuate the valves within the casing C' through the medium of a valve or radius rod R' which is connected at its forward end with the stem S as indicated at 19, and at its rear end to the combination rod at a point adjacent the upper end of the latter as indicated at 20. The lower end of the combination rod R is operatively connected to the main rod M by means of a bell crank lever designated generally at B. As illustrated to advantage in Figure 3, the bell crank lever B comprises companion plates b which embrace the opposite sides of the main rod M and are formed with projections intermediate their ends through which extend pins 21 upon which the plates are fulcrumed.

The upper ends of the plates $b$ are secured to each other by means of bolts 22, and between the plates both above and below the main rod M are spacing blocks 23. The lower ends of the plates B are bent inwardly so as to contact with each other and to provide ears 24 through which extends a pivot pin 25. The pivot pin 25 also extends through a suitable bearing formed in the lower end of the combination rod R thus operatively connecting the rod with the bell crank lever as will be understood. Formed integral with one of the plates $b$ is an arm $b'$ which is disposed in divergent relation with respect thereto. The plates $b$ constitute one arm of the bell crank lever and the arm $b'$ constitutes the other, while the pins 21 form the fulcrum point for the lever.

The bell crank lever B is adapted to be actuated independently of the main rod M through a compensating rod $R^2$ which is pivotally connected at its forward end to the lower end of the arm $b'$, as indicated at 26, and at its rear end to an eccentric crank arm $26^a$ mounted on and keyed to the main crank pin to form a part thereof. By this arrangement it will be seen that the bell crank lever B is adapted to be moved bodily by the main rod M during its reciprocating movement while at the same time it is capable of rocking movement independently of the main rod by means of the compensating rod $R^2$ which latter, because of the manner in which it is pivotally sustained on the crank $26^a$, moves in a path different from that of the main rod to effect a rocking movement of the bell crank lever at predetermined intervals as will be more clearly described hereinafter.

The motion yoke Y' is capable of manual adjustment upon the compensating yoke Y through a reversing mechanism comprising a lever L which is operatively connected to the motion yoke Y' through an actuating rod $R^3$ which is pivotally connected at its forward end, as indicated at 27, to an arm A secured to a shaft T. The shaft T is journaled in suitable bearings formed on the gear frame F, such shaft being adapted to extend transversely of the locomotive and to be operatively connected to the valve gear at the other side of the locomotive. It is thought unnecessary to show and describe the other valve gear as it is a duplication of the present valve gear. Secured to the shaft T is a second arm A' which is pivotally connected at its forward end as indicated at 28 to a hanger or link H. The hanger H in turn is pivotally connected to the forward end of the motion yoke Y' at the point indicated at 29.

By this arrangement it will be seen that upon actuation of the lever L in one direction or the other, rotation of the shaft T in one direction or the other is effected to lower or elevate the arm A' and to thereby cause the motion yoke to swing about the point 17 as a center.

Referring now to Figures 4 to 9 inclusive I have here shown diagrammatically the valve gear shown in Figures 1, 2 and 3, together with the main rod M. The valve cylinder C' and the piston P have been omitted, I having diagrammatically illustrated the valve or valves by the line V. The front end of the main rod M is employed to illustrate the piston in the various positions which it assumes during the operation of the valve gear. This forward end of the main rod M is indicated at M' in all of the diagrammatic views, while the pivotal connections between the several elements comprising the valve gear are illustrated by the small circles. The two vertical lines E and E' in each of the figures are used to designate the central or intermediate positions of the valve B and the piston M', respectively.

In Figure 4, the piston M' is shown as occupying its rear extreme position or back dead center, while the valve V is shown as occupying a corresponding position. In Figure 5, the piston M' is in the forward extreme position and the valve V is disposed adjacent the forward end of the valve cylinder. In Figures 4 and 5, the reversing mechanism for the valve gear is shown as occupying a central or neutral position wherein the valve gear is inoperative to effect the proper actuation of the valve V to supply and exhaust steam to the working cylinders. By reference to the arc G shown in dash lines in these figures, it will be clear that during movement of the main rod M, no motion is imparted to the valve V as the upper end or pivot point 18 of the combination rod R moves in an arc conforming to the length of the radius rod R', thus rendering the valve V ineffective to supply steam to the working cylinder. The rear end of the radius rod R' is connected to the combination rod R the required distance below the pivot point 18 to displace the valve the necessary amount of lap plus the desired lead.

Referring now to Figure 6, the reversing mechanism is here shown in its full forward position to effect an actuation of the valve V to cause the forward movement of the locomotive. As shown in Figure 6, the piston M' is in the central position of its travel through the cylinder while the valve V is in its forward extreme position. With the reversing mechanism in the full forward position let it be assumed that the main rod M moves from the position shown in Figure 5 to the position shown in Figure 6. At the beginning of this movement the piston M' and the valve V occupy the positions shown in Figure 5. As the piston M' moves rearwardly from the position shown in Figure 5, the main rod M moves downwardly bringing the pivot point 18 downward and forward. The downward movement of the main rod M is more rapid than its horizontal movement, and the rapid change of angularity of the combination rod R in an opposite direction to the horizontal movement of the main rod in combination with the rapid advance of the pivot point 25 of the bell crank lever B, which advance is accelerated by the compensating rod R² acting on the arm b', brings the valve V to a position where it has opened the port 1¼" for admission when the piston has receded about 2" or 2½". This position of the valve is retained until the piston has receded about 10½" of its travel in the cylinder. At this position of the valve and gear the main rod M will have reached a point when rearward movement of the pivot point 25 is now retarded by the compensating rod R² causing a rapid increase in the angularity of the combination rod R and thus retarding the upward movement of the rod to effect a relayed rearward movement of the valve V to cut off position. At released position, the bell crank lever B and the combination rod R have assumed positions wherein they move in unison with the main rod M thus accelerating upward movement of the rod R and thereby giving the valve V a rapid movement to effect an opening of the front port to exhaust. This places the valve in position to admit steam to the rear end of the cylinder.

During this operation the main rod M is moved from the position shown in Figure 5 to the position shown in Figure 4. The movement of the main rod from the position shown in Figure 4 to that shown in Figure 7 will now be described, reference being had to Figure 7. As the piston M' advances toward the front of cylinder, the main rod M moves upward moving the pivot point 18 upwardly and 20 rearwardly. At this period, vertical movement of the main rod being more rapid than its horizontal movement, and the retarding change of angularity of the combination rod R in conjunction with the retarded backward movement of the pivot point 25, which movement is retarded by the compensating rod R² acting on the arm b', accelerates upward movement of the pivot point 18 thereby placing the valve in a position where it has opened the port 1¼" for admission when the piston M' has advanced 2½". The valve remains in this position until the piston has advanced 10½" in the cylinder. At this period rearward movement of the pivot point 25 is accelerated by the compensating rod in conjunction with the change in angularity of the combination rod. This movement tends to retard the downward movement of the pivot pin 18 causing the valve to move slowing toward the cut off position. At this period, rearward movement of the pivot point 25 being retarded by the compensating rod R in conjunction with the rapid increase in angularity of the combination rod, and the pivot point 25 moving downward in unison with the main rod, accelerates the downward movement of the pivot point 18 thus giving the valve a rapid movement to open the port for effecting an exhaust and simultaneously placing the valve in position for admission of steam to the front of the piston.

In Figures 8 and 9, the full reverse position of the valve gear and other parts is illustrated. In Figure 8, the valve displacement is the same as in Figure 6, and similarly the valve displacement in Figure 9 is the same as in Figure 7.

Consider Fig. 1. Here the gear is in neither a position for forward or backward motion but is in a central position. From this view it will be clear that the yoke Y' imparts motion to the valve and that by changing the position of the fulcrum point 29 from the position shown in Figure 4 to that shown in Figure 6, the forward motion is obtained. The rear motion is obtained by shifting the fulcrum point 29 from the position shown in Figure 5 to that shown in Figure 8, thus giving the valve its reverse motion. As the fulcrum point 29 is moved from either extreme position to its intermediate position, the valve travel is decreased thus permitting an adjustment of the cut offs.

It is to be particularly noted that the compensating yoke Y because of its mounting with respect to the gear frame and motion yoke, compensates for the unequal lengths of the motion yoke and the radius rod. It is to be further noted that the compensating knuckle 17 moves in an arc opposite to the arc described by the rear end of the motion yoke Y'. This causes the pivot point 18 to move in an arc equal to the length of the radius rod R' thus giving the center of the valve V an equal travel to each side of the center line and thereby equalizing the admission and release of the steam. Furthermore, this movement compensates for any variation in the angularity of the radius rod and the motion yoke.

It is to be particularly noted that formed integral with the plate B is an arm b' which is disposed in divergent relation with respect thereto. This arm in addition to its functions previously mentioned corrects errors in valve events caused by angularity of the main rod. It also corrects errors caused by track conditions and wheel base irregularity.

Attention is directed to the diagrams in Figs. 11 to 16. Figs. 11 to 13 show the gear frame in the forward running position, and in Figs. 14 to 16 in the reverse running position. The gear is in position to produce a 4½" valve travel. The stroke of the piston is 30". In Fig. 11 the valve and crank are at admission. The inside back edge *v* of the valve V is in line with the inside edge of the rear cylinder port *p* in readiness to admit steam after the piston completes its backward stroke and again moves forwardly 2½".

The valve V moves backwardly 1¼" and remains in this position until the piston has traveled 10½" of its forward stroke. At this point, the valve V starts moving forwardly, arriving at the position shown in Fig. 12. At this time, the piston has traveled 22½" of its forward stroke. This is the point of cut off and it from this point that the piston is forced forwardly by the expansion of the steam until it has traveled 27" of its stroke. This brings the valve V and the piston to the positions shown in Fig. 13, the outside back edge of the valve being in line with the outside edge of the rear cylinder port and in position to start releasing the steam from the back of the piston.

On the other hand, the outside front edge of the valve is in line with the outside edge of the front cylinder port, thus closing the exhaust. Any steam remaining in front of the piston must of necessity be compressed, this being so because the piston continues to move forwardly from the point last mentioned until it completes its stroke of 30". This additional motion of the piston places the valve V in position to admit steam in front of the piston for its rearward stroke. The events of the rearward stroke are the same as described for the forward stroke.

Figs. 14, 15 and 16 illustrate a similar cycle of operation but with the gear frame in the reverse running position. It is unnecessary to describe the functions of the valve V since they are precisely as appear above.

Although I have herein shown and described only one form of valve gear embodying my invention, it is to be understood that various changes and modifications may be made herein without departing from the spirit of the invention and the spirit and scope of the appended claims.

What I claim is:

1. A valve gear comprising a valve stem, a frame, a compensating yoke of U-shaped formation fulcrumed on the frame, a motion yoke of U-shaped formation fulcrumed on the compensating yoke, a combination rod pivotally connected at its upper end to said motion yoke at one side of the latter's fulcrum point, a radius rod connected to the combination rod at a point below said motion yoke and to the valve stem, a bell crank lever fulcrumed on the main rod of a locomotive, said combination rod being pivotally connected at its lower end to one arm of said lever, a compensating rod pivotally connected at one end to an eccentric crank arm and pivotally connected to the other arm of said lever, and mechanism operatively connected to said motion yoke at the other side of its fulcrum point for adjusting the yoke, for the purpose described.

2. A valve gear comprising a valve stem, a frame, a compensating yoke fulcrumed on the frame, a motion yoke fulcrumed on the compensating yoke, a bell crank lever fulcrumed on the main rod of a locomotive, a compensating rod pivoted at one end to the bell crank lever and at the other end to an eccentric crank arm on said main rod, a combination rod pivotally connected to the bell crank lever and to the motion yoke, a radius rod pivoted to the combination rod and to the valve stem, and mechanism for adjusting the motion yoke comprising, a shaft, arms fixed to said shaft, a hanger connecting one of said arms to said motion yoke, and manually operable means connected to the other arm for actuating said shaft.

3. A valve gear comprising a valve stem, a compensating yoke mounted for rocking movement, a motion yoke mounted for rocking movement on the forward end of the compensating yoke, a combination rod, a pivotal connection therefor to the rear end of the motion yoke, a radius rod, pivotal connections therefor to the combination rod and to the valve stem, a bell crank lever pivotally supported upon the main rod of a locomotive, a pivotal connection between one arm of the bell crank and said combination rod, a compensating rod arranged to move with the main rod, a pivotal connection between the other arm of the bell-crank and said lever at a point in the rear of the combination rod, and manually operable means for adjusting the motion yoke, for the purpose described.

MATHEW JOSEPH O'LEARY.